July 28, 1942.   R. G. AURIEN   2,291,016
RAILWAY BRAKE
Filed Nov. 15, 1940   3 Sheets-Sheet 1

INVENTOR.
Ray G. Aurien
BY

INVENTOR.
Ray G. Aurien
BY

July 28, 1942. R. G. AURIEN 2,291,016
RAILWAY BRAKE
Filed Nov. 15, 1940 3 Sheets-Sheet 3

INVENTOR.
Ray G. Aurien
BY

Patented July 28, 1942

2,291,016

UNITED STATES PATENT OFFICE 2,291,016

RAILWAY BRAKE

Ray G. Aurien, Chicago, Ill., assignor to American Steel Foundries, Chicago, Ill., a corporation of New Jersey Application November 15, 1940, Serial No. 365,741

25 Claims. (Cl. 188—59)

My invention relates to brake rigging for a railway car truck and more particularly to such a type of rigging commonly designated disk brakes wherein some means of braking the wheel and axle assembly is afforded distinct from the conventional type which utilizes the brake shoes engaging the peripheries of the wheels.

My novel arrangement may be used in conjunction with shoe brakes or without them as may be desired.

An object of my invention is so to arrange the disk brake rigging as to facilitate the use of ordinary clasp brakes in conjunction therewith if desirable.

A general object of my invention is to afford an arrangement for mounting one or more braking disks on each wheel and axle assembly in a manner which will facilitate the simple operation of the braking means and enable me to utilize a minimum number of parts of maximum simplicity.

My invention comprehends an arrangement wherein a plurality of braking disks may be mounted upon a single wheel and axle assembly and a plurality of brake shoes applied to each of said braking disks and all of the braking means be operated by a single power means.

In my novel arrangement I have provided simple means of facilitating the adjustment of the brake shoes at opposite sides of each disk and I have suitably accommodated the adjustments to the use of a single or a plurality of braking disks.

My invention contemplates such an arrangement as that described wherein the power means may be mounted upon a transverse member of the truck frame adjacent the central portion thereof for actuation of the brake rigging at each end of the truck. In this arrangement I may utilize an automatic slack adjuster in conjunction with the power means when desired.

Figure 6 is a fragmentary sectional view taken in the transverse vertical planes indicated by the line 6—6 of Figure 1, said section showing the manner of connection of the brake shoe to the brake head.

Figure 1:
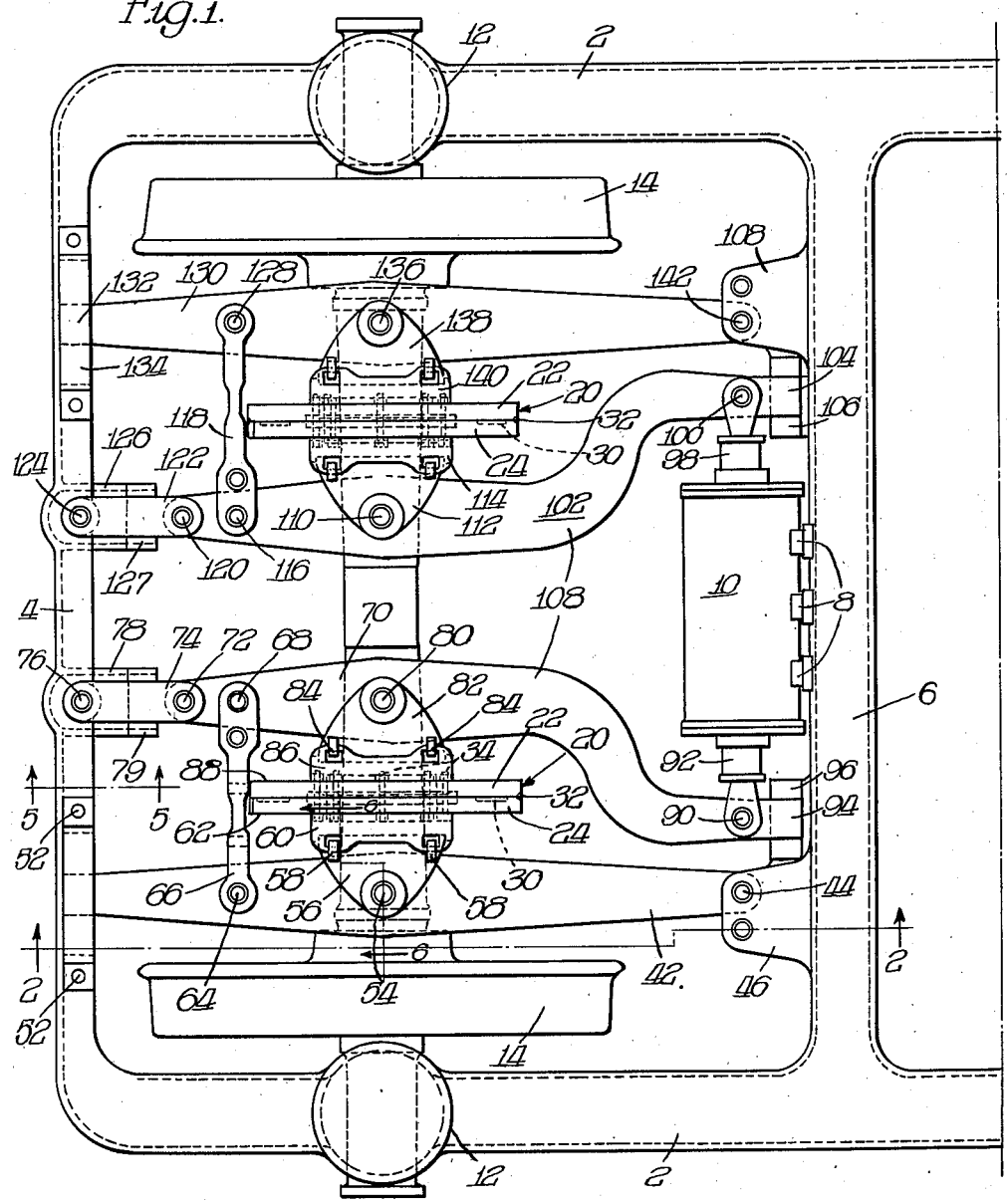
Figure 1 is a top plan view of a truck and brake structure embodying my invention, only one-half of the truck structure being shown inasmuch as the arrangement is similar at opposite ends of the truck.

In each of the figures certain details may be omitted where they are more clearly set forth in other views.

Describing the structure in detail, my novel brake arrangement is shown as utilized in a four wheel truck of well known form comprising an integral frame with the side rails 2, 2, an end transverse member 4 and a transom or intermediate transverse member 6 on which may be conveniently mounted as at 8, 8 dual acting power means or brake cylinder 10. Each side frame is afforded a spring pocket 12 for reception of a spring group (not shown) which may be afforded support on top a journal box (not shown), said box forming the usual means of connection to the wheel and axle assembly generally designated 14, said journal box being normally retained in position in the pedestal opening designated 16 and defined by the spaced pedestal jaws 18, 18.

Figure 2:
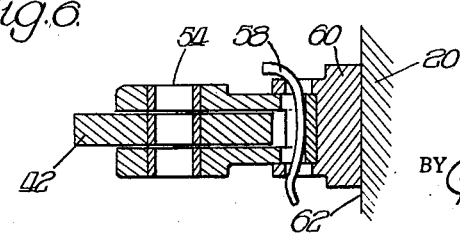
Figure 2 is a side elevation partly in section of the structure shown in Figure 1, the section being taken substantially in the plane indicated by the line 2—2 of Figure 1.
Figure 2:
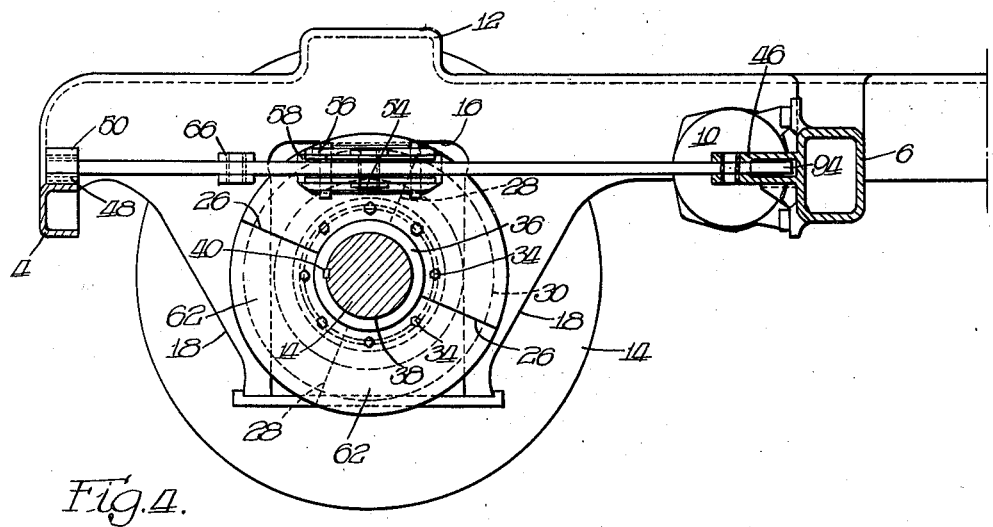

At spaced points on the wheel and axle assembly may be mounted braking disks 20, 20, each of said disks being a composite structure comprising two plates 22 and 24, each of said plates being made up of two parts in the form of half circles abutting each other along a common diameter as at 26, 26. The halves of the respective plates are rotated ninety degrees with respect to the adjacent plate as may be seen at 28, 28 (Figure 2) in order to give rigidity to the disk. In addition, the plates are dovetailed together as indicated at 30, one plate being formed with a shallow annular channel or slot and the mating plate with a complementary annular raised portion for engagement with said slot. After assembly the plates may be welded together about their peripheral abutting edges as at 32 in order to prevent warpage. About their inner peripheries the plates 22 and 24 may be bolted as at 34, 34 to the brake disk hub 36 and said hub may be press-fitted on the axle as at 38 and keyed thereto as at 40 to prevent relative rotation of said hub and said axle.

Figure 5:
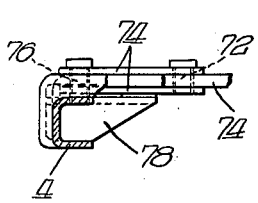
Figure 5 is a fragmentary sectional view taken through the end portion of the truck and brake structure seen in Figure 1, the section being taken substantially in the longitudinal plane indicated by the line 5—5 of said figure.

The brakes associated with each disk comprise a horizontal dead lever 42 adjustably fulcrumed as at 44 from the bracket 46 formed on the intermediate transverse member or transom 6. The opposite end of the dead lever 42 is slidably supported as at 48 in the transverse slot formed by the wear plate 50 secured as at 52, 52 on the end rail 4. At approximately the midpoint of the dead lever 42 is pivotally supported as at 54 (Figure 6) the brake head 56 on which may be rigidly supported by brake shoe keys as at 58, 58 the horizontal brake shoe 60, said brake shoe being arranged to engage the annular braking surface 62 on the adjacent braking disk 20. At an intermediate point of the dead lever 42 may be pivotally connected as at 64 the pull rod 66 and the opposite end of said pull rod may have an adjustable pivotal connection as at 68 to the live horizontal lever 70, one end of which is pivotally secured as at 72 (Figure 5) to the link 74. The opposite end of said link is pivotally secured as at 76 to the bracket 78 formed on the end rail 4, and said link may be afforded slidable support by the wear plate 79 on the bracket 78. Adjacent the midpoint of the horizontal live lever 70 may be pivotally supported as at 80 the horizontal brake head 82 supporting as at 84, 84 the horizontal brake shoe 86 arranged for engagement with the annular braking surface 88 at the opposite side of the lastmentioned disk 20, said brake shoe 86 being supported directly opposite the lastmentioned brake shoe 60 so that the two brake shoes engage the disk on areas directly opposite each other along the opposite sides of the disk leaving the entire remaining braking surface free to facilitate cooling thereof when the brakes are in use. Adjacent its opposite end the horizontal live lever 70 has a pivotal connection as at 90 to the piston rod 92 at one end of the double acting power means 10 and the adjacent end of the lever 70 is projected as at 94 for slidable support on the wear plate carried on the shelf 96 formed as an integral part of the bracket 46.

At the opposite end of the double acting power means 10 the piston rod 98 has a pivotal connection as at 100 to the live horizontal lever 102, the adjacent end of said lever 102 being projected as at 104 for slidable support on the shelf 106 forming a part of the bracket 108. The similar cylinder levers 70 and 102 are offset in opposite directions as at 108 to afford clearance for the power means 10. Intermediate the ends of the lever 102 is pivotally supported as at 110 the brake head 112 carrying the brake shoe 114 and at a further intermediate point of said lever 102 is pivotally and adjustably connected as at 116 the pull rod 118. The adjacent end of the lever 102 has a pivotal connection as at 120 to the link 122 whose opposite end is fulcrumed as at 124 in the bracket 126 formed on the end rail 4, said bracket carrying at its extremity the wear plate 127 affording slidable support for the link 122.

The opposite end of the pull rod 118 has a pivotal connection as at 128 to the horizontal dead lever 130 whose adjacent end is slidably supported as at 132 within the slot defined by the plate 134 mounted on the end rail 4 in manner similar to that described for the opposite side of the truck. Adjacent its midpoint the dead lever 130 affords pivotal support as at 136 for the brake head 138 on which is mounted the brake shoe 140. The dead end of the lever 130 is adjustably fulcrumed as at 142 from the bracket 108.

The method of operation of the braking means by actuation of the double acting power means will be readily apparent to those skilled in the art. It may be noted that each dead horizontal lever is afforded an adjustable fulcrum to accommodate wear of brake shoes and of braking disks and to adapt the brake arrangement to lateral movement of the wheel and axle assembly with respect to the car truck, while the pull rods connecting the live and dead horizontal levers associated with each disk are also adjustable. It may further be noted that the live levers connected to the piston rods at one end are secured at their opposite ends to links which permit the required amount of play to accommodate the positioning of said live levers and facilitate equalization of wear on the shoes and disks.

Figure 4:
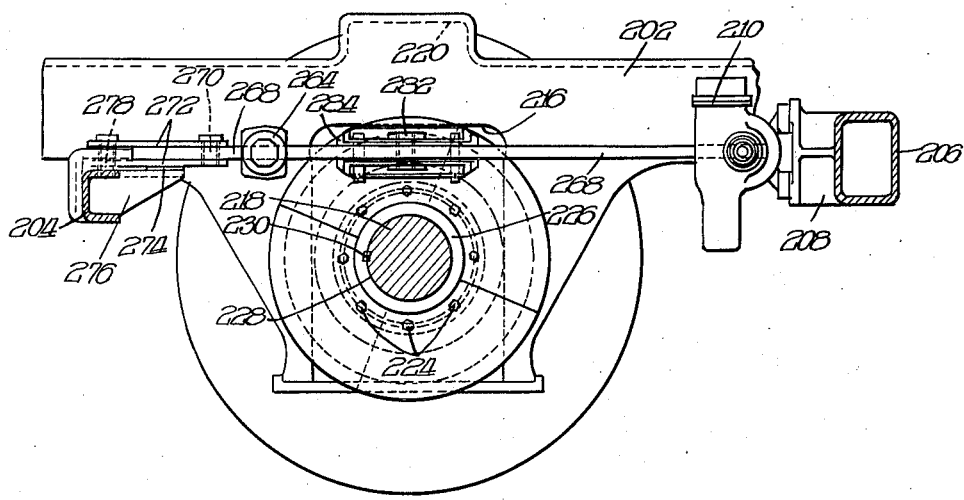
Figure 4 is a side elevation partly in section of the truck and brake arrangement shown in Figure 3, the section being taken in the longitudinal planes indicated by the line 4—4 of Figure 3.
Figure 3:
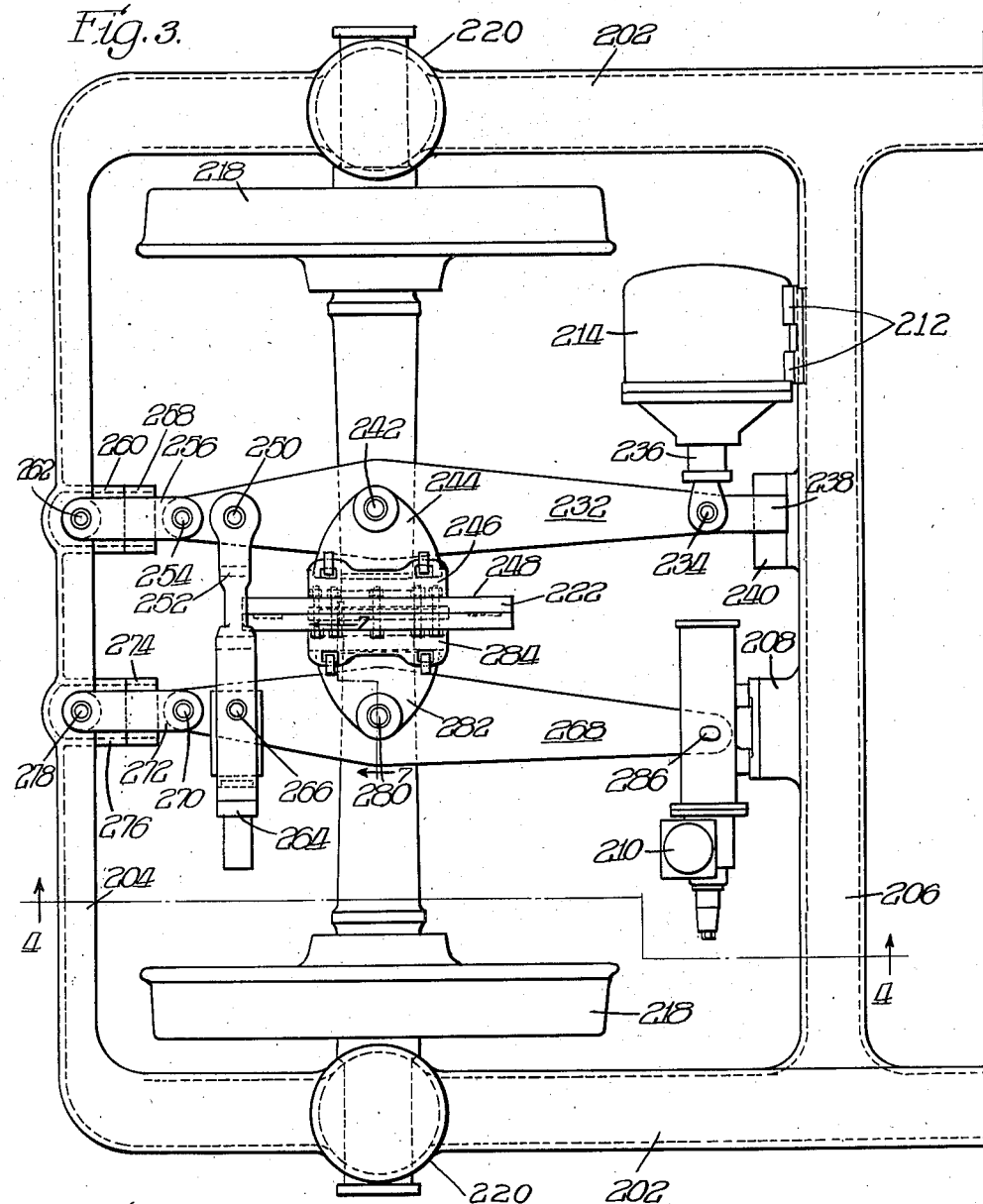
Figure 3 is a top plan view of a different car truck and brake arrangement embodying my invention in another modification. In this view also one end of the truck structure is shown inasmuch as the arrangement is similar at opposite ends of the truck.

In the modification shown in Figures 3 and 4 a single disk is used on each wheel and axle assembly at each end of the truck. The truck is similar to that shown in the previous modification comprising the integrally formed spaced side rails 202, 202, the end rail 204 and the intermediate transverse member or transom 206. On an intermediate point of the transom 206 may be formed the bracket 208 serving as a means of support for the automatic slack adjuster 210 and adjacent the opposite end of the transom 206 may be mounted as at 212, 212 power means or brake cylinder 214.

The side members 202, 202 are formed with the usual pedestal jaws, each defining a pedestal opening 216 for reception of the usual journal box (not shown) forming a means of connection to the journal ends of the wheel and axle assembly 218. The frame may be supported on said journal boxes by spring means (not shown), an end of said spring means being received in the spring seat 220 formed above the journal box on each side rail 202. At the midpoint of the wheel and axle assembly may be mounted the brake disk 222 similar in form and structure to the disks described by the previous modification, said disk being secured about its inner periphery by the retaining bolts 224, 224 serving as means of connection to the brake disk hub 226 which may be press-fitted as at 228 on the axle of the wheel and axle assembly 218 and secured thereon against rotation by the key 230.

The braking means comprises the horizontal live cylinder lever 232 pivotally connected as at 234 to the piston 236 of the power means 214, the adjacent end of the said lever 232 being projected as at 238 for support on the wear plate carried on the shelf 240 formed on the transom 206. Adjacent its midpoint the lever 232 affords pivotal support as at 242 for the horizontal brake head 244 with its shoe 246 arranged for engagement with the annular braking surface 248 on one side of the disk 222 at the top thereof. At a spaced intermediate point the lever 232 has a pivotal connection as at 250 with the adjustable pull rod 252 and the adjacent end of the live lever 232 has a pivotal connection as at 254 with the link 256 slidably supported on the wear plate 258, mounted on the bracket 260 formed as a part of the end rail 204. The opposite end of the link 256 is pivotally secured as at 262 on said bracket.

Figure 7:
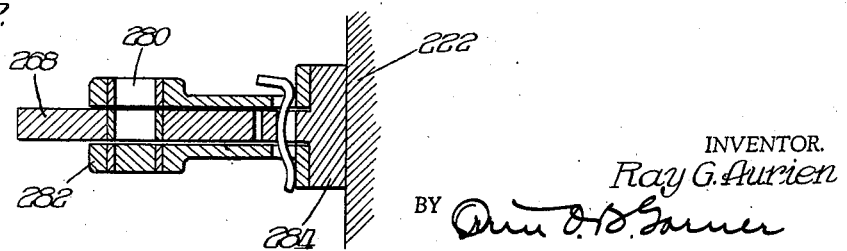
Figure 7 is a view comparable to Figure 6 but of another modification, said view being taken in the transverse vertical planes indicated by the line 7—7 of Figure 3.

At the opposite end of the pull rod 252 is carried the manual slack adjuster 264 and said slack adjuster has the adjustable connection as at 266 with the horizontal dead lever 268, the adjacent end of said lever 268 having a pivotal connection as at 270 (Figure 4) to the link 272 which is slidably supported on the wear plate 274 carried on the bracket 276 formed as a part of the end rail 204, the opposite end of said link having a pivotal connection as at 278. Adjacent the midpoint of the lever 268 is pivotally supported as at 280 (Figure 7) the horizontal brake head 282 carrying the brake shoe 284 for engagement with the annular braking surface of the disk 222 on an area opposite the area on said disk engaged by the lastmentioned shoe. The dead end of the lever 268 is adjustably fulcrumed as at 286 from the automatic slack adjuster 210.

The method of operation of this modification will be readily clear to those skilled in the art. It may be noted that both the live and dead levers are restricted in movement not only by the adjustable pull rod which connects them at adjacent ends but also by the link means by which they are tied to the end rails, thus permitting them a degree of play which will accommodate even wear of the shoes at opposite sides of the disk and lateral movements of the wheel and axle assembly with respect to the truck frame.

It is to be understood that I do not wish to be limited by the exact embodiments of the device shown which are merely by way of illustration and not limitation as various and other forms of the device will, of course, be apparent to those skilled in the art without departing from the spirit of the invention or the scope of the claims.

I claim:

1. In a railway car truck, a frame having spaced transverse members, power means and slack adjuster means mounted on one of said transverse members, a wheel and axle assembly supporting a braking disk intermediate said members, live and dead cylinder levers connected at corresponding ends respectively to said power means and slack adjuster means and adjustably connected to each other adjacent their opposite ends, means on the other of said transverse members restricting the transverse movement of said lastmentioned ends, and brake means carried on said levers for engagement of opposite sides of said disk, said brake means comprising horizontal brake heads supporting brake shoes for engagement with the upper portions of said disk at opposite sides thereof, said braking disk having braking surfaces otherwise unengaged to permit maximum cooling area in operation.

2. In a brake arrangement for a railway car truck, a frame having spaced transverse members, power means and slack adjuster means supported at spaced points on one of said members, a wheel and axle assembly supporting a braking disk between said members, a live lever connected to the piston of said power means and slidably supported on the adjacent transverse member, a dead lever connected to said slack adjuster, a pull rod adjustably connecting the opposite ends of said levers, and brake heads on said levers supporting brake shoes for engagement with the opposite sides of said disk, the connected ends of said levers being pivotally and slidably supported from the other of said transverse members to accommodate relative lateral movement between said wheel and axle assemblies and said frame.

3. In a brake arrangement for a railway car truck, a frame having spaced transverse members, double acting power means and spaced fulcrums mounted on one of said members, a wheel and axle assembly supporting spaced disks intermediate said members and braking means comprising live levers connected at corresponding ends to the pistons at opposite ends of said power means, dead levers connected at corresponding ends to said fulcrums, adjustable connections between respective live and dead levers adjacent their opposite ends, said dead levers being slidably supported at their opposite ends from the other of said transverse members, and said live levers having pivotal and slidable support from said lastmentioned transverse member, and braking means carried on said levers for engagement with braking surfaces on opposite sides of said disks.

4. In a brake arrangement for a railway car truck, a frame having a transom and an end rail, double acting power means and spaced fulcrums on said transom, a supporting wheel and axle assembly carrying spaced brake disks, live cylinders connected at opposite ends to said power means extending between said disks and swingably fulcrumed at their opposite ends from said end rail, dead truck levers pivoted at corresponding ends from said fulcrums and slidably supported at their opposite ends on said end rail, connections between the live and dead levers associated with each disk, and brake heads pivotally supported on each of said levers and carrying brake shoes for engagement with opposite sides of the adjacent disks, said swingable connections accommodating relative lateral movement between said disks and said frame.

5. In a brake arrangement for a railway car truck, a frame having spaced transverse members, power means and fulcrum means supported at spaced points on one of said members, a supporting wheel and axle assembly carrying a braking disk intermediate said members, live and dead levers connected at corresponding ends to said power means and said fulcrum means, a pull rod adjustably connecting said levers adjacent their opposite ends, braking means supported on said levers for engagement with opposite surfaces of said disk, and a pivotal and slidable connection between one of said levers and the other of said transverse members to restrain the lateral movement thereof while accommodating said movement to relative lateral motion between said frame and wheel and axle assembly.

6. In a brake arrangement for a railway car truck, a frame having spaced transverse members, power means and fulcrum means mounted on one of said members, a wheel and axle assembly supporting a braking disk intermediate said members, live and dead levers connected respectively to said power means and said fulcrum means at corresponding ends and extending on opposite sides of said disk, an adjustable connection between said levers adjacent their opposite ends, braking means mounted on said levers for engagement with opposite sides of said disk, one of said levers having a slidable support on the other of said transverse members, and the other of said levers having a swingable pivotal connection thereto to accommodate relative lateral movement between said wheel and axle assembly and said frame.

7. In a brake arrangement for a railway car truck, a frame having spaced transverse members, power means and fulcrum means mounted on one of said members, a wheel and axle assembly supporting a braking disk intermediate said members, live and dead levers connected respectively to said power means and said fulcrum means at corresponding ends and extending on opposite sides of said disk, an adjustable connection between said levers adjacent their opposite ends, braking means mounted on said levers for engagement with opposite sides of said disk, both of said levers having a swinging pivotal connection with the other of said transverse members to accommodate relative lateral motion between said wheel and axle assembly and said frame.

8. In a railway car truck, a frame having a transom and an end rail, power means and slack adjuster means supported at spaced points on said transom, a supporting wheel and axle assembly carrying a brake disk intermediate said rail and transom, live and dead levers connected at corresponding ends to said power means and slack adjuster means and adjustably connected to each other adjacent their opposite ends, and braking means supported at intermediate points on said levers for engagement with opposite sides of said disk, the lastmentioned ends of said levers being swingably pivoted from said end rail to accommodate lateral movement of said wheel and axle assembly with respect to said truck frame.

9. In a brake arrangement for a railway car truck, a frame having transverse members, double acting power means and spaced fulcrums on one of said members, a supporting wheel and axle assembly carrying spaced disks intermediate said members, live levers connected at opposite ends to said power means extending between said disks and swingably fulcrumed at their opposite ends from the other of said transverse members, dead truck levers fulcrumed at corresponding ends from said fulcrums and slidably supported at their opposite ends on the lastmentioned transverse member, connections between the respective live and dead levers, and braking means supported on said levers for engagement with opposite sides of the adjacent disks.

10. In a brake arrangement for a railway car truck, a frame having a transom and an end rail, double acting power means and spaced fulcrums on said transom, a supporting wheel and axle assembly carrying spaced brake disks, live cylinder levers connected at opposite ends to said power means extending between said disks and swingably fulcrumed at their opposite ends from said end rail, dead truck levers pivoted at corresponding ends from said fulcrums and slidably supported at their opposite ends on said end rail, connections between the live and dead levers associated with each disk, and brake heads pivotally supported on respective of said levers and carrying brake shoes for engagement with opposite sides of the adjacent disks.

11. In a brake arrangement for a railway car truck, a frame having spaced transverse members, power means and slack adjuster means supported at spaced points on one of said members, a wheel and axle assembly supporting a braking disk between said members, a live lever connected to the piston of said power means and slidably supported on the adjacent transverse member, a dead lever connected to said slack adjuster, a pull rod adjustably connecting the opposite ends of said levers, and brake heads on said levers supporting brake shoes for engagement with the opposite sides of said disk.

12. In a brake arrangement for a railway car truck, a frame having spaced transverse members, a supporting wheel and axle assembly intermediate said members, a brake disk on said axle, power means and fulcrum means on one of said transverse members, live and dead levers secured at corresponding ends to said power means and fulcrum means and adjustably connected to each other adjacent their opposite ends, and brake heads and brake shoes supported on said levers for braking opposite sides of said disk, the opposite ends of said levers being slidably fulcrumed from the other of said transverse members.

13. In a railway car truck, a frame having spaced transverse members, power means and slack adjuster means mounted on one of said transverse members, a wheel and axle assembly supporting a braking disk intermediate said members, live and dead cylinder levers connected at corresponding ends respectively to said power means and slack adjuster means and adjustably connected to each other adjacent their opposite ends, means on the other of said transverse members restricting the transverse movement of said lastmentioned ends, and brake means carried on said levers for engagement of opposite sides of said disk.

14. In a brake arrangement for a railway car truck, a frame having spaced transverse members, a supporting wheel and axle assembly intermediate said members, a brake disk on said axle, power means and fulcrum means on one of said transverse members, live and dead levers secured at corresponding ends to said power means and fulcrum means and connected to each other adjacent their opposite ends, and brake heads and brake shoes supported on said levers for braking opposite sides of said disk, the opposite ends of said levers being slidably fulcrumed from the other of said transverse members.

15. In a brake arrangement for a railway car truck, a frame having spaced transverse members, a supporting wheel and axle assembly having a braking disk, power means and fulcrum means mounted on one of said transverse members and live and dead brake levers connected at corresponding ends respectively to said power means and said fulcrum means and adjacent their opposite ends to each other and brake means supported on said levers for engagement with opposite sides of said disk, one of said levers being afforded slidable support and the other of said levers pivotal and slidable support from the other of said transverse members.

16. In a railway car truck, a frame having a transom and an end rail, power means and slack adjuster means supported at spaced points on said transom, a supporting wheel and axle assembly carrying a brake disk intermediate said rail and transom, live and dead levers connected at corresponding ends to said power means and slack adjuster means and automatically adjustably connected to each other adjacent their opposite ends, and braking means supported at intermediate points on said levers for engagement with opposite sides of said disk, and means on said end rail affording movable support for certain of said levers.

17. In a brake arrangement for a railway car truck, a frame having spaced transverse members, a supporting wheel and axle assembly having a braking disk, power means and fulcrum means mounted on one of said transverse members and live and dead brake levers connected at corresponding ends respectively to said power means and said fulcrum means and adjacent their opposite ends to each other, and brake means supported on said levers for engagement with opposite sides of said disk, said levers being afforded slidable support from the other of said transverse members.

18. In a brake arrangement for a railway car truck, a frame having spaced transverse members, a supporting wheel and axle assembly having a braking disk, power means and fulcrum means mounted on one of said transverse members and live and dead brake levers connected at corresponding ends respectively to said power means and said fulcrum means and adjacent their opposite ends to each other, and brake means supported on said levers for engagement with opposite sides of said disk, and means on the other of said transverse members restricting the lateral movement of certain of said levers.

19. In a brake arrangement for a railway car truck, a frame having spaced transverse members, a supporting wheel and axle assembly intermediate said members, a brake disk on said axle, power means and fulcrum means on one of said transverse members, live and dead levers secured at corresponding ends to said power means and fulcrum means and adjustably connected to each other adjacent their opposite ends, and brake heads and brake shoes supported on said levers for braking opposite sides of said disk, said levers being extended beyond said adjustable connection for support from the other of said transverse members.

20. In a brake arrangement, a frame comprising spaced members, a supporting wheel and axle therebetween, a brake disk on said axle, live and dead levers supported at their opposite ends from said members respectively, said dead lever being automatically adjustably connected to one of said members, brake means on said levers engaging said disk, and means for operating said live lever.

21. In a brake arrangement for a railway car truck, a frame comprising spaced members, a supporting wheel and axle assembly, a brake disk on said axle, live and dead levers adjustably connected intermediate their ends and supported at their opposite ends from said members respectively, brake means on said levers for engagement with said disk, and means for operating said live lever.

22. In a brake arrangement for a railway car truck, a frame comprising transverse members, a supporting wheel and axle therebetween, a brake disk on said axle, live and dead levers adjustably connected adjacent corresponding ends and supported at their opposite ends from said members respectively, brake means on said levers for engagement with said disk, and power means connected to said live lever.

23. In a brake arrangement, a truck frame having spaced transverse members, a supporting wheel and axle carrying a brake disk, spaced live and dead levers adjustably connected intermediate their ends to each other and supported at their opposite ends from said members respectively, braking means on said levers for association with said disk, and means for operating said live lever.

24. In a brake arrangement, a truck frame having spaced members, a supporting wheel and axle assembly carrying spaced braking disks, double acting power means mounted on one of said members, live levers connected at corresponding ends to opposite ends of said power means adjacent one of said members and swingably fulcrumed at their opposite ends from the other of said members, dead levers adjustably fulcrumed from one of said members and adjustably connected adjacent their opposite ends to said live levers respectively, and braking means mounted on said levers for engagement with opposite sides of said disks.

25. In a brake arrangement for a railway car truck having spaced transverse members, double acting power means on one of said members, a supporting wheel and axle assembly carrying spaced brake disks between said members, live levers swingably supported from one of said members and extending between said disks for connection to opposite ends of said power means, dead levers fulcrumed from one of said members, slidably supported from the other thereof and connected respectively to said live truck levers, and brake means on the respective sets of live and dead levers for engagement with opposite sides of the disks.

RAY G. AURIEN.